(12) United States Patent
Bernier

(10) Patent No.: US 11,661,147 B2
(45) Date of Patent: May 30, 2023

(54) ACTUATED SCRATCHERS FOR A TRACKED VEHICLE

(71) Applicant: Arctic Cat Inc., Thief River Falls, MN (US)

(72) Inventor: Morgan L. Bernier, Red Lake Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 346 days.

(21) Appl. No.: 17/021,070

(22) Filed: Sep. 15, 2020

(65) Prior Publication Data

US 2021/0061415 A1  Mar. 4, 2021

Related U.S. Application Data

(63) Continuation of application No. 16/720,373, filed on Dec. 19, 2019, now Pat. No. 10,800,492, which is a continuation of application No. 15/811,945, filed on Nov. 14, 2017, now Pat. No. 10,549,817.

(60) Provisional application No. 62/421,577, filed on Nov. 14, 2016.

(51) Int. Cl.
*B62M 27/02* (2006.01)

(52) U.S. Cl.
CPC ....... *B62M 27/02* (2013.01); *B62M 2027/023* (2013.01); *B62M 2027/027* (2013.01)

(58) Field of Classification Search
CPC ............ B62M 27/02; B62M 2027/023; B62M 2027/027
See application file for complete search history.

(56) References Cited

U.S. PATENT DOCUMENTS

| | | | |
|---|---|---|---|
| 4,076,089 A | 2/1978 | Sanders | |
| 5,277,266 A | 1/1994 | Robinson | |
| 7,389,842 B2 | 6/2008 | Inoguchi et al. | |
| 7,527,116 B2 | 5/2009 | Aoshima | |
| 7,918,298 B2 * | 4/2011 | Cook | F01P 9/00 37/219 |
| 8,646,559 B2 * | 2/2014 | Beaudoin | B62M 27/02 37/219 |
| 9,038,758 B2 * | 5/2015 | Vezina | B62M 27/02 37/219 |
| 9,321,509 B2 | 4/2016 | Beavis | |
| 9,610,987 B2 * | 4/2017 | Bedard | B62M 27/02 |
| 10,549,817 B2 | 2/2020 | Bernier | |
| 2011/0192667 A1 | 8/2011 | Conn et al. | |
| 2015/0034403 A1 | 2/2015 | Bedard | |
| 2020/0016950 A1 | 1/2020 | Lavallee et al. | |

FOREIGN PATENT DOCUMENTS

JP  2000043781 A  2/2000

* cited by examiner

*Primary Examiner* — Jacob D Knutson
*Assistant Examiner* — Harold Eric Pahlck, III
(74) *Attorney, Agent, or Firm* — Billion & Armitage

(57) ABSTRACT

A system and method for deploying scratchers for a tracked vehicle, such as a snowmobile, are described. The scratchers can be deployed in response to the engine temperature of the tracked vehicle exceeding a predetermined threshold. Alternatively, the scratchers can be deployed via actuation of a switch by an operator.

18 Claims, 12 Drawing Sheets

ACTUATED SCRATCHERS FOR A TRACKED VEHICLE

This application is a continuation of U.S. application Ser. No. 16/720,373, filed Dec. 19, 2019, which is a continuation of U.S. application Ser. No. 15/811,945, filed Nov. 14, 2017, now U.S. Pat. No. 10,549,817, issued on Feb. 4, 2020, which claims benefit of U.S. Provisional Application No. 62/421,577, filed on Nov. 14, 2016 and which application is incorporated herein by reference. A claim of priority is made.

BACKGROUND

During operation, components of a snowmobile, such as the track and slide rails, may be cooled and lubricated by sprays of loose snow that are generated during the normal operation of the snowmobile on loose snow. Additionally, devices have been developed to scratch a surface of the ice or snow to generate a spray of ice or snow when a snowmobile operates in order to provide a desired cooling and lubrication. These devices are known by many different names such as snow tillers, spray generating devices, ice or snow scratchers, and snow lubrication devices.

SUMMARY

Embodiments relate to a snowmobile comprising a main frame and a tunnel coupled to the main frame, and a skid frame assembly coupled to the tunnel. The skid frame assembly includes a rear suspension, at least one skid rail coupled to the rear suspension, and at least one actuator having a scratcher coupled thereto. The actuator has a deployed configuration and an undeployed configuration.

Embodiments also relate to a method for automatically deploying scratchers coupled to a snowmobile, the method comprising the steps of providing an engine. providing at least one scratcher. providing a temperature sensor, determining, with the temperature sensor, the temperature of the engine, and deploying the at least one scratcher when the temperature of the engine is greater than or equal to a predetermined threshold.

Embodiments relate to a method for automatically deploying at least one scratcher coupled to a snowmobile, the method comprising the steps of providing an engine having a cooling system. providing at least one scratcher, providing a temperature sensor, determining, with the temperature sensor, the temperature of the coolant within the coolant system, and deploying the at least one scratcher when the temperature of the coolant is greater than or equal to a predetermined threshold.

BRIEF DESCRIPTION OF THE DRAWINGS

In the drawings, which are not necessarily drawn to scale, like numerals may describe similar components in difference views. The drawings illustrate generally, by way of example, but not by way of limitation, various embodiments discussed in the present document.

DETAILED DESCRIPTION

Figure 1:
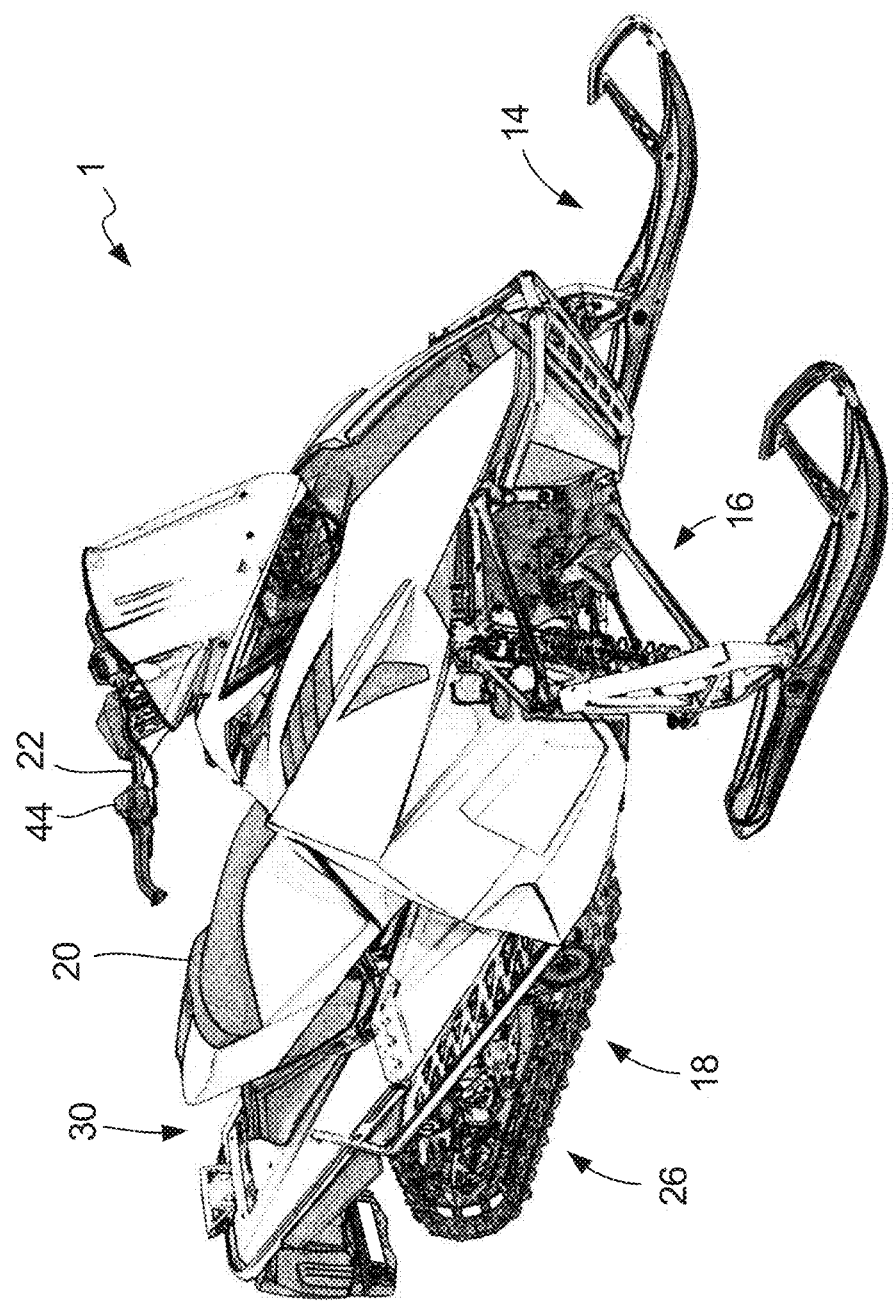
FIG. 1 shows a projection view of an embodiment of a snowmobile.
Figure 2:
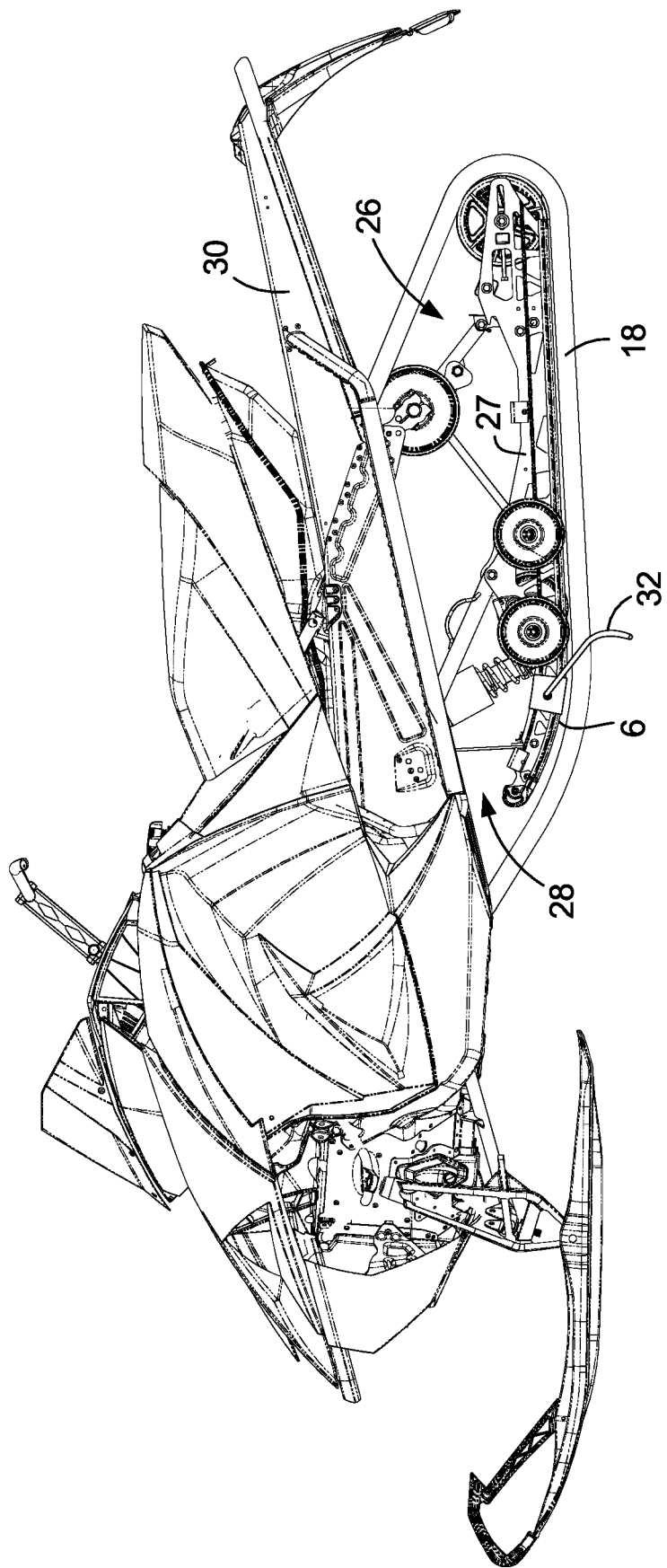
FIG. 2 shows a side view of an embodiment of a snowmobile.
Figure 3:
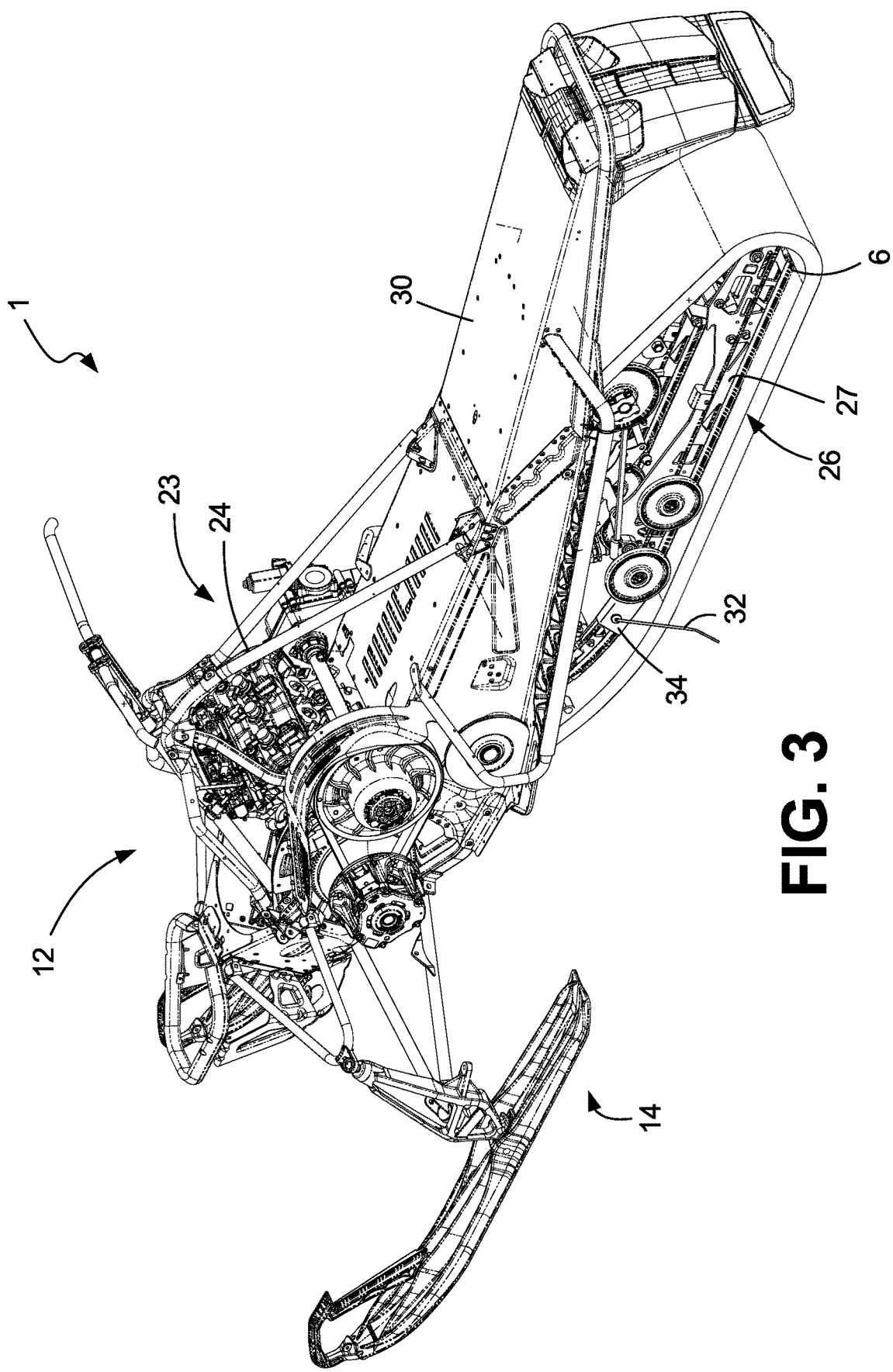
FIG. 3 shows a projection view of an embodiment of a snowmobile.

As shown in FIG. 1, a tracked vehicle 1, such as a snowmobile, comprises a frame 12 (FIG. 3), one or more skis 14 attached to the frame via a front suspension 16, a track 18, at least one seat 20, handlebars 22, an engine compartment 23 (FIG. 3), and an engine 24 (FIG. 3). Additionally, in at least some embodiments, the seat 20 is a straddle seat. The tracked vehicle also includes, in at least some embodiments, a skid frame assembly 26 comprising a rear suspension 28 (FIG. 2). In some embodiments, the rear suspension 28 is coupled to the frame 12 of the tracked vehicle, for example, via a tunnel 30.

As shown in FIGS. 2-5, in at least some embodiments, the skid frame assembly 26 includes one or more skid rails 27. As shown in FIG. 3, the skid rail(s) 27 include a wear strip 6 adjacent to a lower surface of the skid rail(s) 27. In at least some examples, the one or more skid rails 27 are formed from an aluminum material, however, a polymeric material, or any other suitable material, can be employed. Combinations of materials, alloys, metals, plastics, etc., can also be used. In some examples, the skid frame assembly 26, or at least a portion thereof, is formed from a hollow member which can be located along a longitudinal centerline of the tracked vehicle 1, for example as shown in U.S. Pat. No. 9,321,509, the contents of which are herein incorporated by reference in their entirety. Further, in some embodiments, the skid frame assembly 26, or at least a portion thereof, includes multiple hollow members which can be laterally offset from one another and which generally extend in the longitudinal direction of the tracked vehicle 1.

Figure 4:
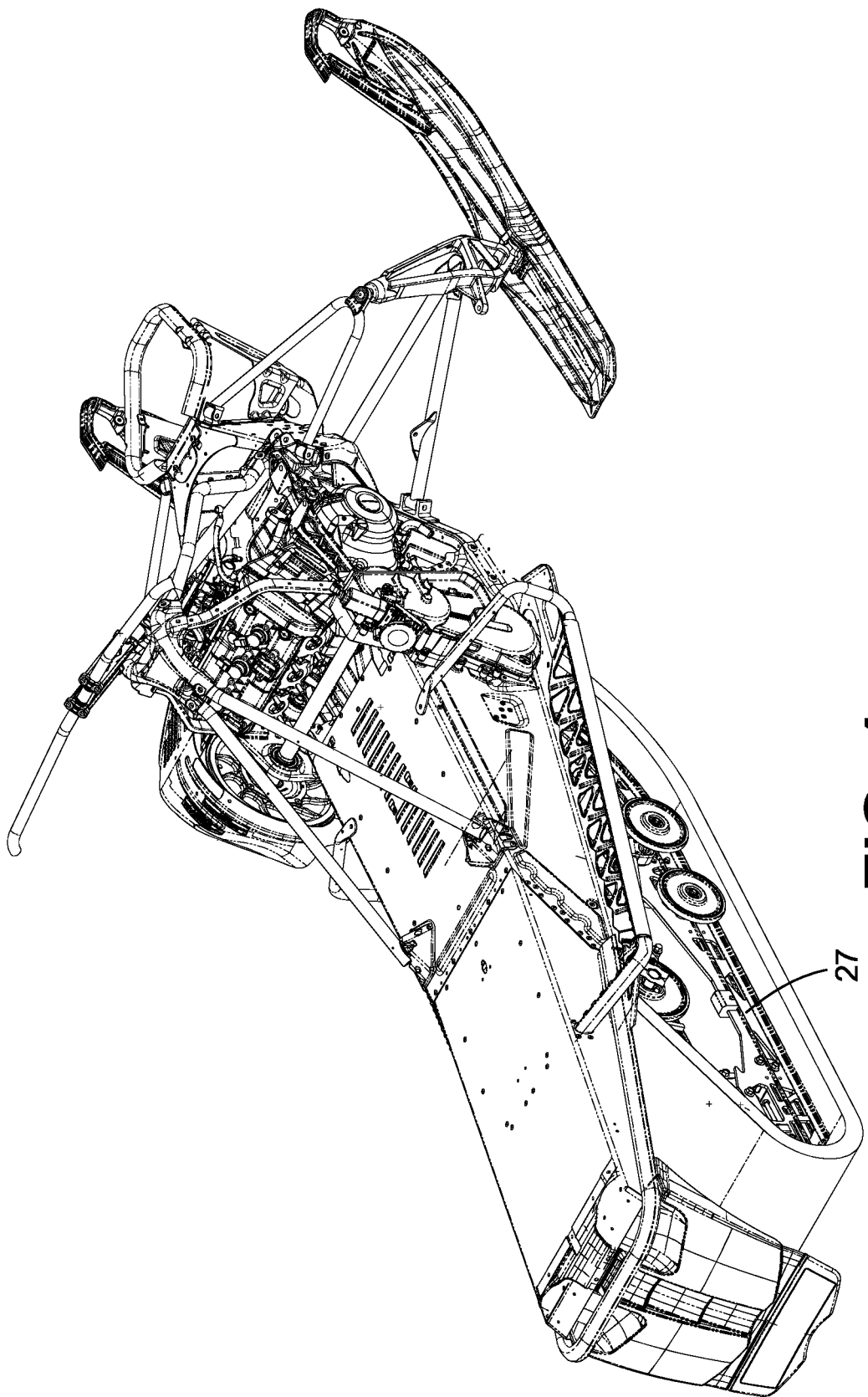
FIG. 4 shows a projection view of an embodiment of a snowmobile.

With further regard to FIGS. 3 and 4, in some embodiments, the tracked vehicle 1 has one or more scratchers 32. The scratchers 32 can be deployed to throw snow and/or ice into the skid frame assembly 26 to provide lubrication for the track 18 and skid frame assembly 26 and, further, to cool the engine 24, for example via a heat exchanger 52, which can be located beneath a portion of the tunnel 30 or as a portion of the tunnel 30. In at least some embodiments, the heat exchanger 52 includes coolant passages (not shown) through which coolant flows to cool the engine 24. In some embodiments, the one or more scratchers 32 are formed from a spring-steel material, though other materials can also be used. In some embodiments, the scratchers 32 are deployed in order to prevent overheating of the engine, as discussed in greater detail below.

Figure 5:
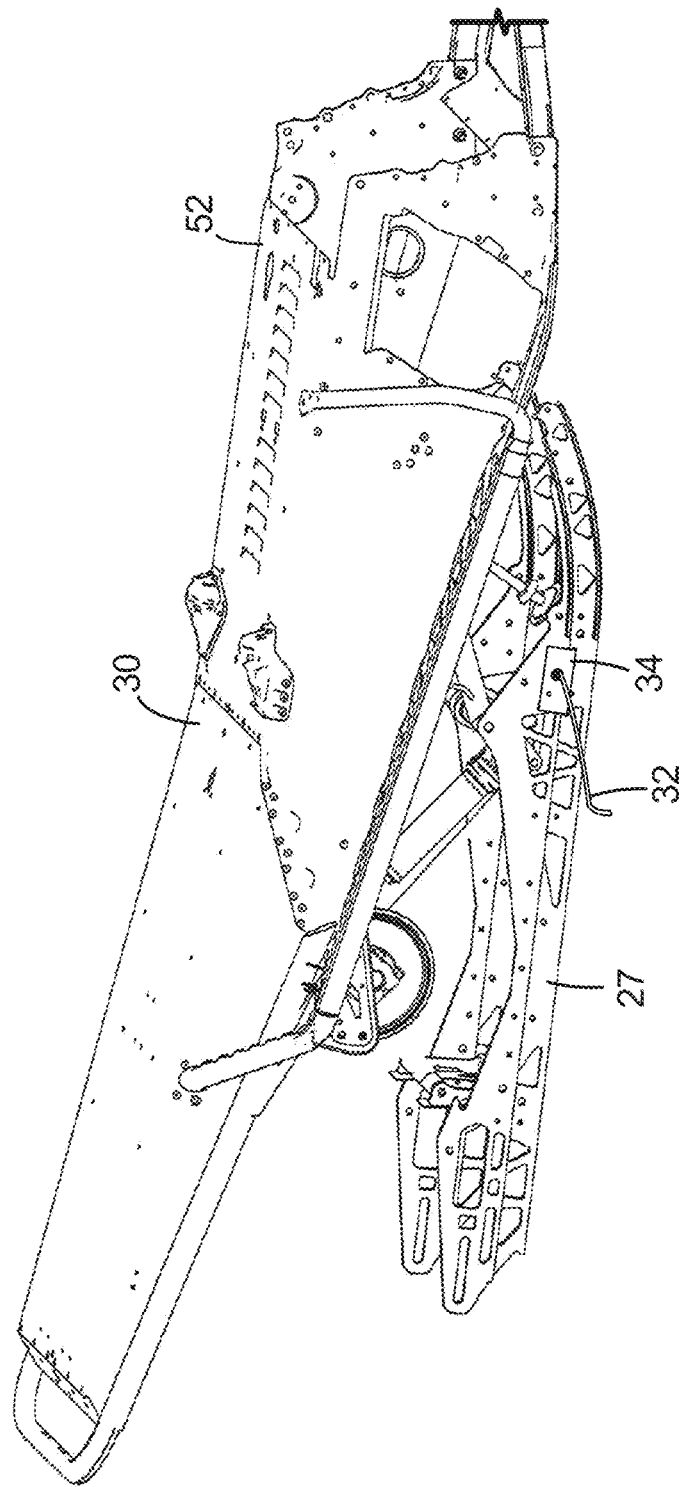
FIG. 5 shows a projection view of an embodiment of a portion of a snowmobile.

With regard to FIG. 5, in at least some embodiments, the one or more scratchers 32 are coupled to an actuator 34. The actuator 34, in turn, is mounted to the skid frame assembly 26, or other suitable portion of the tracked vehicle 1, for example via a fastener such as a bolt, rivet, strap, etc. In at least some embodiments the actuator(s) 34 is controlled electromechanically, however the actuator can be purely mechanical (e.g., cable actuated), or it can be hydraulic, pneumatic, or any suitable combination. As will be appreciated, other actuation modes can also be employed. In some embodiments, the actuator(s) 34 comprises a rotary actuator; in some embodiments, a linear actuator is employed; some embodiments utilize a direct current motor, such as a stepper-motor; some embodiments employ a solenoid. Again, other modes can also be utilized.

Further, the one or more actuators 34 can mounted in any suitable location. Where the one or more actuators 34 are mounted to one or more of the skid rails 27, they can be mounted thereto in any suitable location, for example, ahead of a shock attachment location, behind a shock attachment location, etc. As will be appreciated, other locations may also be suitable.

Figure 6:
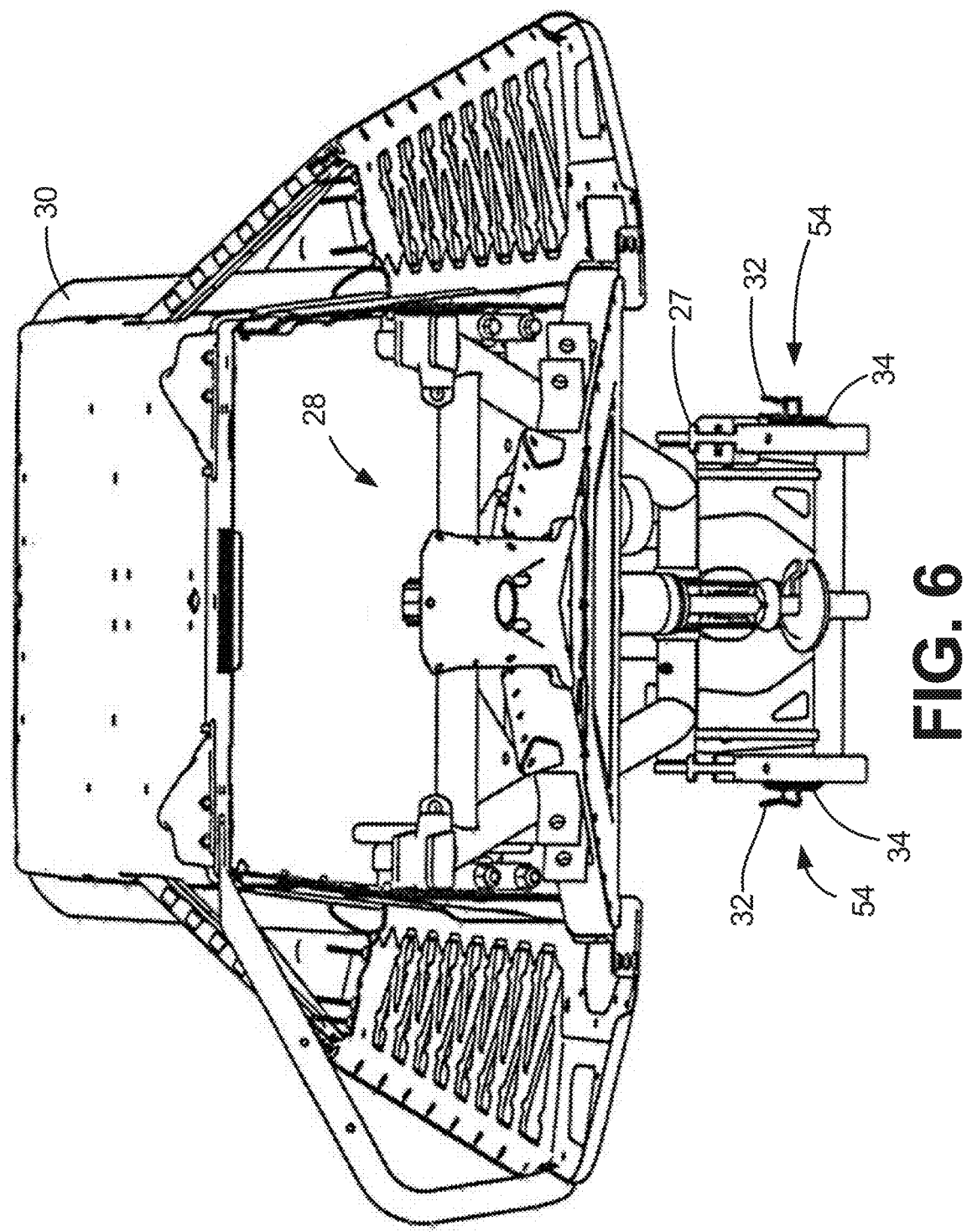
FIG. 6 shows a projection view of the portion of the snowmobile of FIG. 5.

Referring to FIG. 6, in some embodiments, the skid frame assembly 26 includes a plurality of scratcher assemblies 54. In at least some embodiments, the skid frame assembly 26 includes two scratcher assemblies 54, each scratcher assembly including an actuator 34 and a at least one scratcher 32. In some embodiments, a scratcher assembly 54 is coupled to an outer side of the skid rail 27, as shown in FIG. 6, for example.

Figure 10:
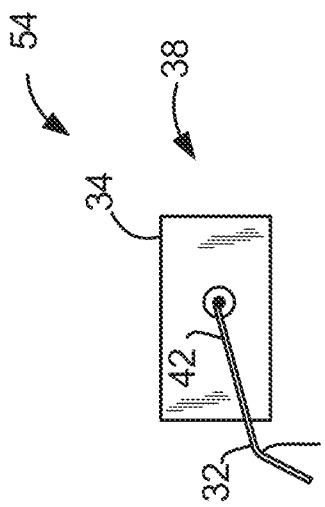
Figure 9:
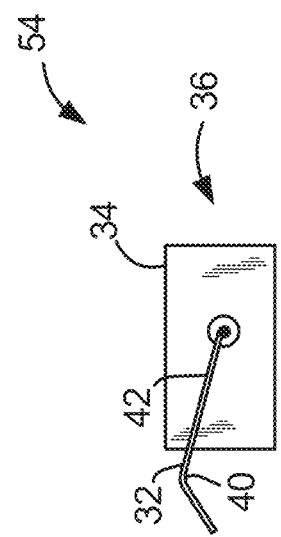

As shown in FIGS. 9 and 10, the actuator 34 has a first configuration 36 and a second configuration 38. In the first configuration 36 the scratcher(s) 32 is retracted; in the second configuration 38 the scratcher is deployed. Upon deployment, at least a portion of the scratcher(s) 32 contacts the ground. In at least some embodiments, the scratcher(s) 32 make contact with snow or ice covering the ground. In some embodiments, the scratcher(s) 32 includes one or more bent portions 40 and one or more straight portions 42.

Figure 8:
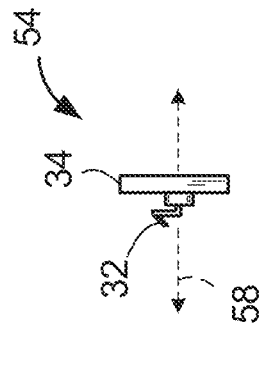
FIG. 8 shows a front view of the scratcher assembly of FIG. 7.
Figure 7:
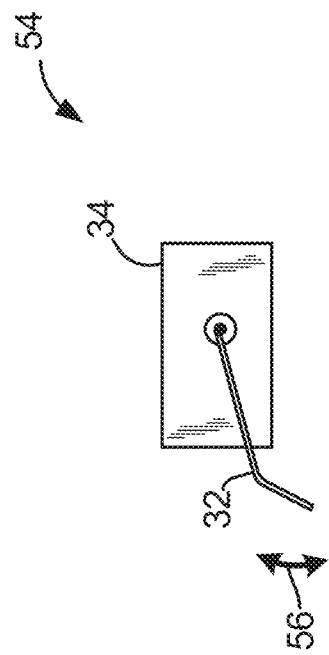
FIGS. 7, 9, and 10 show side views of an embodiment of a scratcher assembly.

Referring to FIG. 7, arrow 56 illustrates rotation of the scratcher 32 about pivot axis 58 (FIG. 8), in order to deploy or retract the scratcher 32. In FIGS. 7 and 8, a rotary-style actuator is illustrated, however, any suitable of actuator can be employed.

Figures 11, 12:
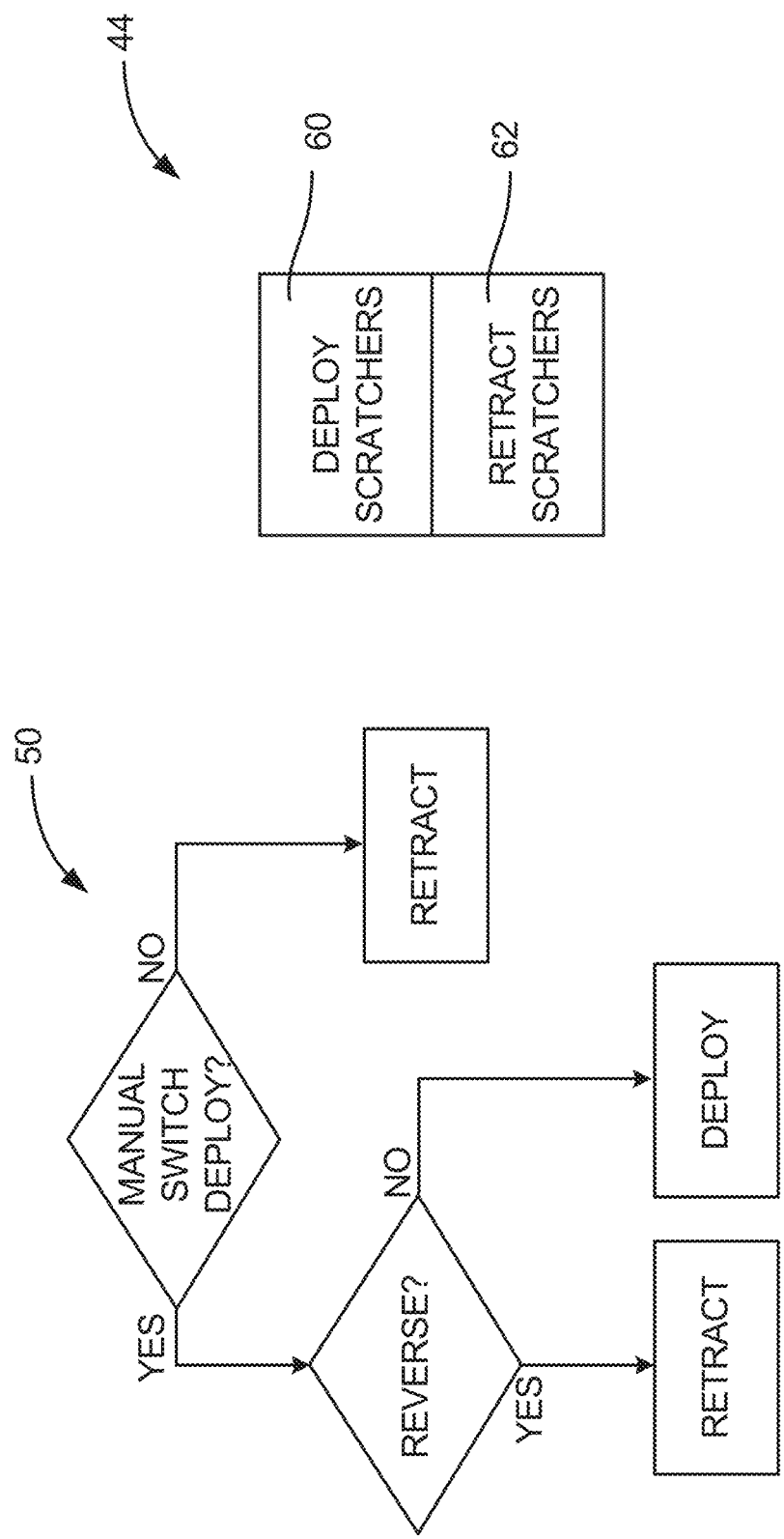
FIG. 11 shows an example of a logic flow chart.
FIG. 12 shows an embodiment of a selector switch.

Referring to FIG. 11, an embodiment of a flow chart 50 for deploying or retracting the one or more actuators 34 is shown. In some embodiments, the tracked vehicle 1 includes a selector switch 44 (FIG. 1), which can be located on the handlebars 22, or any other suitable location (e.g., electronic display with touch-pad, body panel, etc.). The selector switch 44 can have one or more selectable configurations. As illustrated in FIG. 12, the selector switch 44 can be manually operable by the rider to select between the deploy configuration 60 and retract configuration 62. In some embodiments, the selector switch 44 is 2-position toggle switch, however a rotary, momentary, or any other suitable switch can be utilized.

Returning to FIG. 11, in some embodiments, the tracked vehicle 1 includes logic for retracting or deploying the one or more scratchers 32 via the one or more actuators 34. In some embodiments, for example, the logic will not deploy the scratchers 32 if the tracked vehicle 1 is in reverse. As will be appreciated, operating the tracked vehicle 1 in reverse with the scratchers 32 deployed could cause damage to the scratchers 32. The logic can be implemented via an ECU (engine control unit), analog circuit, dedicated processor, or in any other suitable way.

Figure 14:
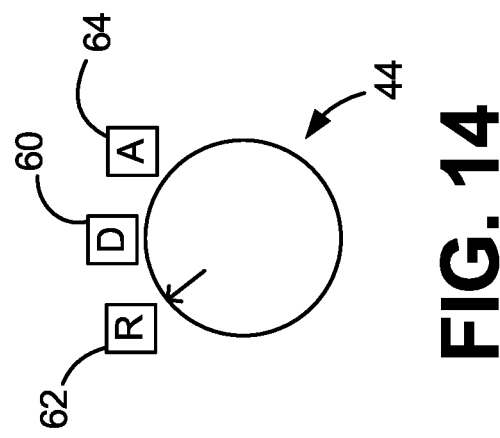
FIG. 14 shows an embodiment of a selector switch.

With regard to FIG. 14, in some embodiments, the selector switch 44 is a 3-position switch. In some embodiments, the selector switch 44 is a rotary switch, for example as shown in FIG. 14. By way of example, and as shown in FIG. 14, the selector switch includes a retract configuration 62 (illustrated via "R" in FIG. 14), deploy configuration 60 (illustrated via "D"), and an auto configuration 64 (illustrated via "A"). The selector switch 44 shown in FIG. 14 can be rotated to any of the three configurations—R, D, A, respectively.

Figure 13:
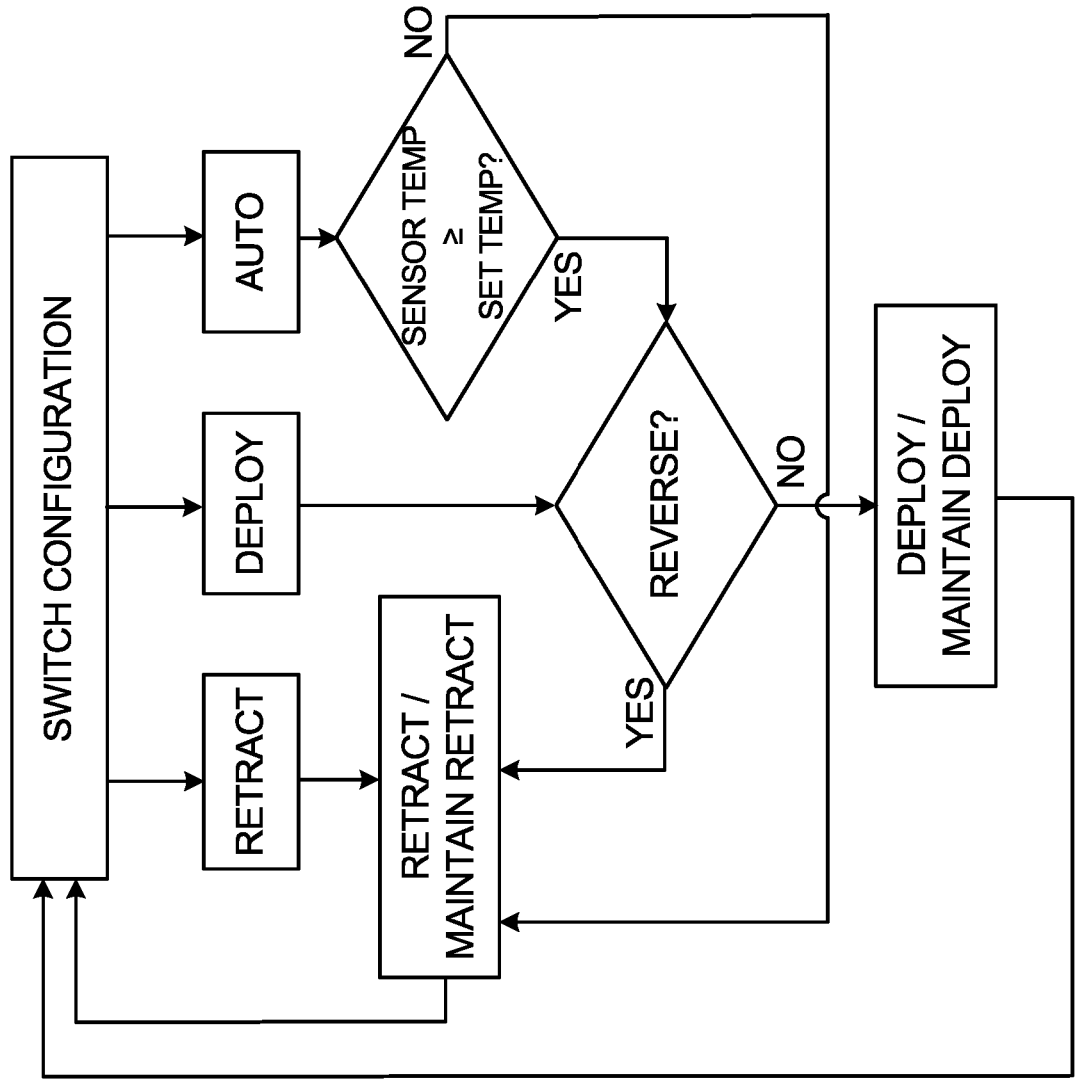
FIG. 13 shows another example of a logic flow chart.

Referring to FIG. 13, an example of control logic governing the operation of the switch of FIG. 14 is illustrated. When placed in the retract configuration, corresponding to reference numeral 62 in FIG. 14, the actuator 34 will retract the scratcher 32 (or maintain the scratcher(s) 32 in a retracted configuration if the scratcher is already arranged in the retracted configuration). When placed in the deploy configuration, corresponding to reference numeral 60 in FIG. 14, the actuator 34 will deploy the scratcher 32 if the control logic determines that the vehicle is not placed in reverse. Finally, where the switch 44 is placed in the auto configuration, corresponding to reference numeral 64 in FIG. 14, the actuator 34 will retract and deploy the scratcher 32 automatically. In some embodiments, the actuator 34 will deploy (maintain deployment) the scratcher 32 when two conditions are satisfied: (1) the tracked vehicle 1 is not in reverse and (2) the temperature sensor determines that the temperature has reached a predetermined threshold value. When the temperature falls below the threshold value, the scratcher(s) 32 are automatically retracted (maintained in a retracted configuration). Further, when the tracked vehicle 1 is placed in reverse the scratcher(s) 32 are automatically retracted. In some embodiments, the temperature sensor samples the coolant temperature of the coolant flowing through the engine 24. In some embodiments, the temperature sensor measures the temperature of the engine 24 directly, for example cylinder head temperature. In some embodiments, the temperature sensor measures the ambient air temperate in the engine compartment 23.

Figure 15:
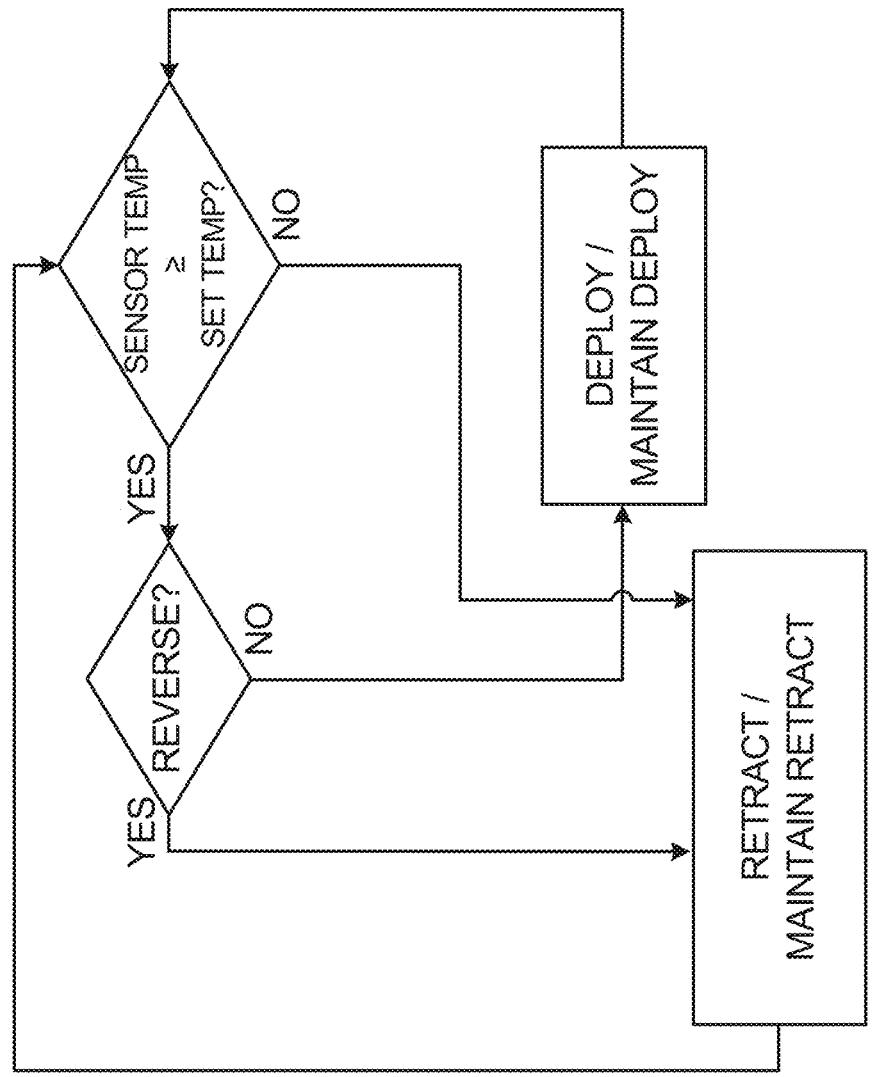
FIGS. 15 and 16 show examples of logic flow charts.

Turning to FIG. 15, in some embodiments, the tracked vehicle 1 doesn't have a selector switch 44 and, instead, the actuator(s) 34 automatically deploy the scratcher(s) 32 when: (1) the tracked vehicle 1 is not in reverse and (2) the temperature sensor determines that the temperature has reached a predetermined threshold value. In some embodiments, however, the selector 44 can simply be an ON/OFF switch. In an "OFF" configuration, the actuator(s) 34 do not deploy the scratcher(s) 32. In the "ON" configuration, however, the actuator(s) deploy the scratcher(s) 32 when: (1) the tracked vehicle 1 is not in reverse and (2) the temperature sensor determines that the temperature has reached a predetermined threshold value. When the temperature falls below the threshold value, the scratcher(s) 32 are automatically retracted. Further, when the tracked vehicle 1 is placed in reverse the scratcher(s) 32 are automatically retracted.

Figure 16:
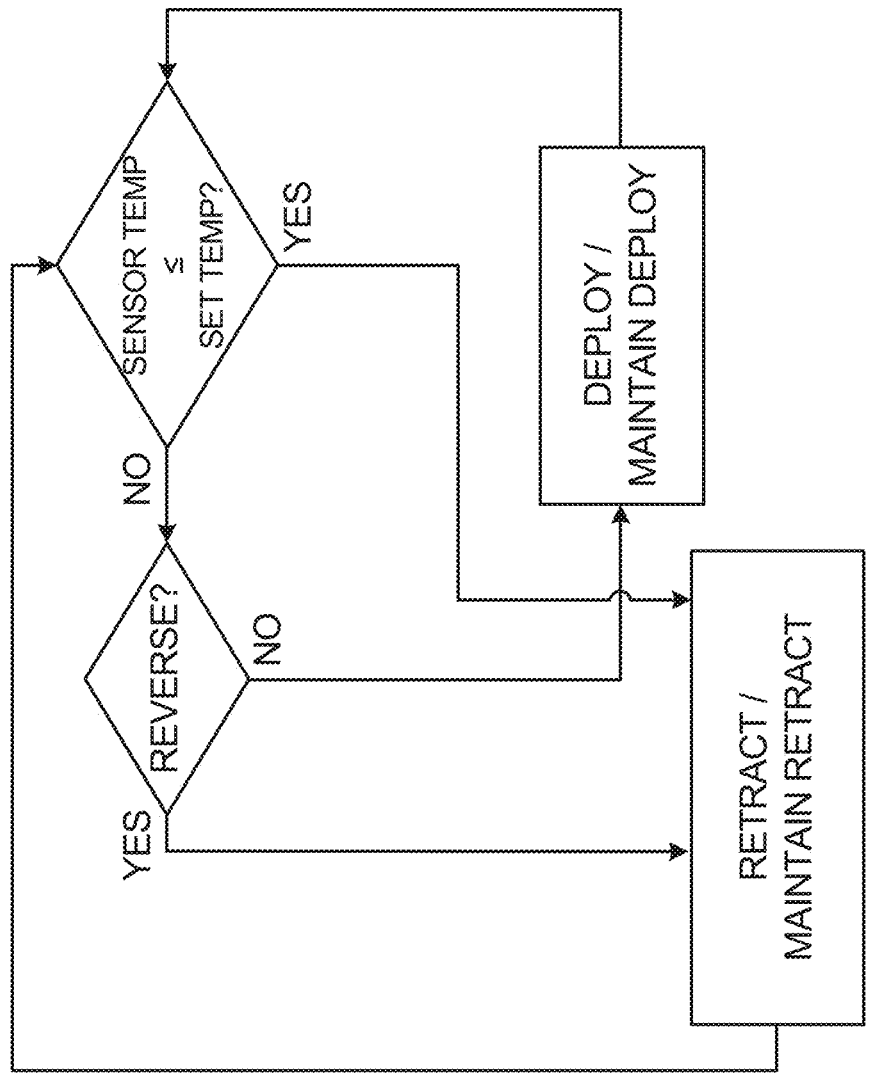

With regard to FIG. 16, an embodiment of control logic is shown. In this instance, the actuator(s) 34 will retract (or maintain in a retracted configuration) when the temperature is below a predetermined threshold. Further, the actuator(s) 34 will retract (or maintain in a retracted configuration) when the tracked vehicle 1 is placed in reverse.

In some embodiments, the scratcher(s) 32 will remain in first configuration 36 regardless of sensor measurements (e.g., temperature sensor measurement), vehicle speed, forward/reverse configuration, or any other suitable inputs which might otherwise activate the actuator(s) 34. In some embodiments, the actuator(s) 34 will retract or deploy in response to the tracked vehicle 1 traveling at a predetermined speed. For example, the actuator(s) 34 can retract the scratcher(s) 32 above a threshold speed.

In some embodiments, the temperature sensor will continuously evaluate the temperature of the engine or engine's cooling system, or other desired condition designed to activate the actuator(s) 34. In some embodiments, an ECU (electronic control unit) 46 automatically controls the actuator(s) 34.

Figure 17:
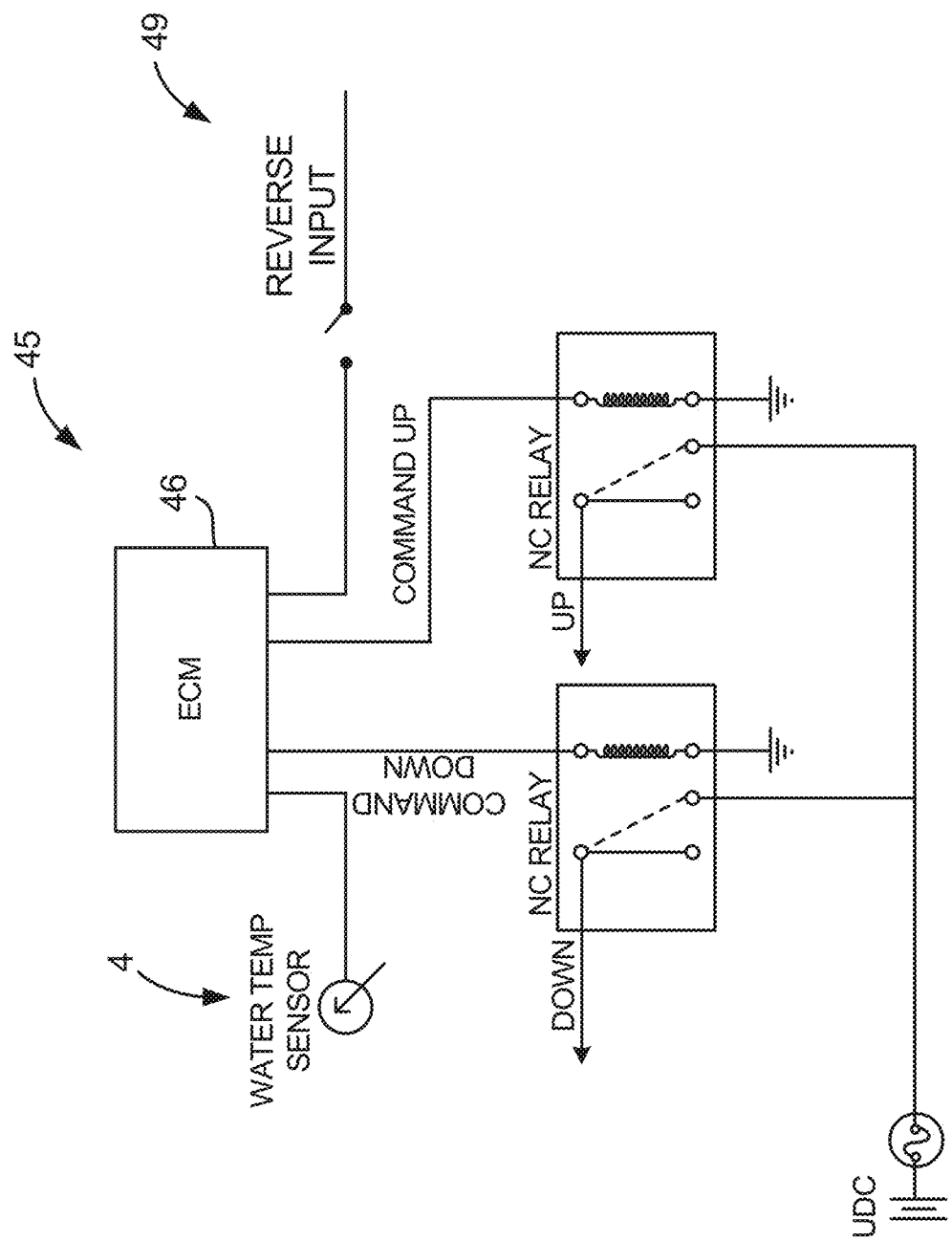
FIG. 17 shows an example of an electrical circuit.

With further regard to FIG. 17, an example of an electrical circuit 45 is shown. In some embodiments, the ECU will take inputs from the temperature sensor 4 and a reverse input switch 49. When the ECU determines that the temperature exceeds a predetermined threshold temperature, the ECU will send a "command down" signal to the actuator 34 to deploy the scratcher(s) 32, unless the reverse input switch 49 indicates that the tracked vehicle 1 is in reverse. Further, when the ECU determines that the temperature drops below a predetermined threshold temperature, the ECU will send a "command up" signal to the actuator 34 to retract the scratcher(s) 32. It will be appreciated that, in some embodiments, the ECU will monitor the configuration of the actuator 34 (deployed or retracted) and no signal will be sent to the actuator 34 unless desired. For example, if the scratcher(s) 32 are retracted and the temperature sensor 4 determines that the engine temperature has exceeded the predetermine threshold temperature, the ECU will not send a "command down" signal to deploy the scratcher(s) 32 if the tracked vehicle 1 is in reverse.

In some embodiments, the ECU will monitor the configuration of the actuator(s) on a period basis, for example once every 500 milliseconds, or other appropriate time interval.

In some embodiments, the predetermined temperature threshold to deploy the scratcher(s) 32 is different than the predetermined temperature to retract the scratcher(s). For example, in some embodiments, the predetermined threshold to retract the scratcher(s) is less than the predetermined temperature used to deploy the scratcher(s) 32. In some embodiments, this is desirable to reduce the likelihood that the scratcher(s) 32 will be repeatedly deployed and retracted. Additionally, in some embodiments, when the measured temperature decreases by a predetermined amount, the scratcher(s) 32 will retract into first configuration 36. Further still, the ECU, via temperature sensor 4, can determine the rate of change in temperature. In this way, the ECU can send signals to deploy or retract the scratcher(s) 32, at least in part, based on a control system having greater inputs. For example, the ECU can rely on a PI, PD, or PID (proportional-integral-derivative) algorithm or controller.

While the above detailed description has shown, described, and pointed out novel features of a tracked vehicle as applied to various embodiments, it will be understood that various omissions, substitutions, and changes in the form and details of the device or process illustrated may be made by those skilled in the art without departing from the spirit and scope of the disclosure. The application is, therefore, intended to cover any variations, uses, or adaptations of using these general principles. Further, this application is intended to cover such departures from the present disclosure as come within known or customary practice in the art to which this invention pertains.

What is claimed is:

1. A snowmobile comprising:
   a tunnel;
   a skid frame assembly coupled to the tunnel, the skid frame assembly comprising:
   a rear suspension;
   at least one skid rail coupled to the rear suspension; and
   at least one actuator having a scratcher coupled thereto, wherein the at least one actuator has a deployed configuration and an undeployed configuration;
   wherein the at least one actuator is controlled by an analog circuit.

2. The snowmobile of claim 1, wherein the scratcher comprises at least a straight portion and a bent portion.

3. The snowmobile of claim 1, further comprising a cooling system to cool an engine.

4. The snowmobile of claim 3, further comprising a temperature sensor to determine the temperature of a coolant.

5. The snowmobile of claim 3, wherein, when the coolant is above a predetermined temperature, the at least one actuator deploys the scratcher to the deployed configuration.

6. The snowmobile of claim 5, wherein, when the coolant is below a predetermined temperature, the at least one actuator retracts the scratcher to the undeployed configuration.

7. The snowmobile of claim 1, wherein the at least one actuator comprises a direct current motor.

8. The snowmobile of claim 1, wherein the scratcher is formed from spring-steel.

9. The snowmobile of claim 1, wherein the at least one actuator is attached to the skid frame assembly.

10. The snowmobile of claim 1, wherein the at least one actuator is attached to the skid rail.

11. A snowmobile comprising:
    a tunnel;
    a skid frame assembly coupled to the tunnel, the skid frame assembly comprising:
    a rear suspension;
    at least one skid rail coupled to the rear suspension; and
    at least one actuator having a scratcher coupled thereto, wherein the actuator has a deployed configuration and an undeployed configuration;
    wherein the at least one actuator is controlled by a dedicated processor.

12. The snowmobile of claim 11, wherein the scratcher is formed from spring-steel.

13. The snowmobile of claim 11, wherein the at least one actuator is attached to the skid frame assembly.

14. The snowmobile of claim 11, wherein the at least one actuator is attached to the skid rail.

15. A method for automatically deploying at least one scratcher coupled to a snowmobile, the method comprising the steps of:
    providing an engine;
    providing at least one scratcher;
    providing a temperature sensor;
    determining, with the temperature sensor, the temperature of the engine; and
    deploying the at least one scratcher when the temperature of the engine is greater than or equal to a predetermined threshold,
    wherein determining the temperature of the engine includes one or more of a direct engine temperature and a measurement of the temperature of the air around the engine.

16. The method of claim 15, comprising further providing a manual switch and activating the manual switch to override deployment of the at least one scratcher regardless of the engine temperature.

17. The method of claim 15, further comprising sensing a speed of the snowmobile and, when the speed is greater than a predetermined speed, the at least one scratcher is deployed.

18. The method of claim 15, further comprising sensing a speed of the snowmobile and, when the speed is less than a predetermined speed, the at least one scratcher is then retracted.

* * * * *